(12) United States Patent
You et al.

(10) Patent No.: US 8,501,343 B2
(45) Date of Patent: Aug. 6, 2013

(54) POUCH-TYPE BATTERY

(75) Inventors: Seungjae You, Daejeon (KR); Min Su Kim, Daejeon (KR)

(73) Assignee: LG Chem, Ltd., Seoul (KR)

(*) Notice: Subject to any disclaimer, the term of this patent is extended or adjusted under 35 U.S.C. 154(b) by 951 days.

(21) Appl. No.: 12/297,414

(22) PCT Filed: Apr. 7, 2007

(86) PCT No.: PCT/KR2007/001705
§ 371 (c)(1),
(2), (4) Date: Oct. 16, 2008

(87) PCT Pub. No.: WO2007/119950
PCT Pub. Date: Oct. 25, 2007

(65) Prior Publication Data
US 2009/0311592 A1 Dec. 17, 2009

(30) Foreign Application Priority Data
Apr. 17, 2006 (KR) .................. 10-2006-0034364

(51) Int. Cl.
*H01M 2/00* (2006.01)
(52) U.S. Cl.
USPC ........................... 429/163; 429/180
(58) Field of Classification Search
USPC .................................. 429/163, 162
See application file for complete search history.

(56) References Cited

U.S. PATENT DOCUMENTS

| 4,396,691 | A | 8/1983 | Wheadon | |
|---|---|---|---|---|
| 6,042,966 | A | 3/2000 | Cheu | |
| 6,743,546 | B1* | 6/2004 | Kaneda et al. | 429/127 |
| 2003/0170535 | A1 | 9/2003 | Watanabe et al. | |
| 2004/0038126 | A1 | 2/2004 | Gu | |
| 2005/0100784 | A1* | 5/2005 | Yageta et al. | 429/160 |
| 2005/0191549 | A1 | 9/2005 | Kang et al. | |
| 2007/0196732 | A1* | 8/2007 | Tatebayashi et al. | 429/181 |

FOREIGN PATENT DOCUMENTS

| JP | 2004-71301 A | 3/2004 |
|---|---|---|
| JP | 3602797 B2 | 10/2004 |
| JP | 2005-285503 A | 10/2005 |
| JP | 2005-285506 A | 10/2005 |
| JP | 2006-66311 A | 3/2006 |
| TW | 1248694 B | 2/2006 |
| WO | WO 2005074054 A1 * | 8/2005 |

* cited by examiner

*Primary Examiner* — Patrick Ryan
*Assistant Examiner* — Lucas J O Donnell
(74) *Attorney, Agent, or Firm* — Birch, Stewart, Kolasch & Birch, LLP

(57) ABSTRACT

Disclosed herein is a pouch-type battery including a cathode and an anode protruding from opposite sides of a battery case in opposite directions, wherein the pouch-type battery is constructed in a structure in which two receiving parts are formed at a one-unit sheet-type battery case in a symmetrical fashion such that an electrode assembly is received in the receiving parts, the battery case is bent between the two receiving parts (along a bending line) such that one of the receiving parts overlaps with the other receiving part while the electrode assembly is received in the other receiving part, the bent battery case being sealed, the two receiving parts are continuously formed while the two receiving parts are in contact with the bending line, and the battery case is provided at the edge thereof where the bending line runs with bent depression parts having a depth equivalent to that of the receiving parts. The pouch-type battery is manufactured with a capacity equivalent to twice that of a conventional battery through a simple assembly process, and is constructed in a structure in which the battery case is prevented from breakage during the assembly process.

10 Claims, 2 Drawing Sheets

POUCH-TYPE BATTERY

TECHNICAL FIELD

The present invention relates to a pouch-type battery, and, more particularly, to a pouch-type battery including a cathode and an anode protruding from opposite sides of a battery case in opposite directions, wherein the pouch-type battery is constructed in a structure in which two receiving parts are formed in a one-unit sheet-type battery case in a symmetrical fashion such that an electrode assembly is received in the receiving parts, the battery case is bent between the two receiving parts (along a bending line) such that one of the receiving parts overlaps with the other receiving part while the electrode assembly is received in the other receiving part, the bent battery case being sealed, the two receiving parts are continuously formed while the two receiving parts are in contact with the bending line, and the battery case is provided at the edge thereof where the bending line runs with bent depression parts having a depth equivalent to that of the receiving parts.

BACKGROUND ART

As mobile devices have been increasingly developed, and the demand of such mobile devices has increased, the demand for batteries has also sharply increased as an energy source for the mobile devices. Also, much research on batteries satisfying various needs has been carried out.

In terms of the shape of batteries, the demand of prismatic secondary batteries or pouch-type secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

Generally, a pouch-type secondary battery is constructed in a structure in which an electrode assembly is mounted in a pouch-type case made of an aluminum laminate sheet. Specifically, the pouch-type secondary battery is manufactured by forming a receiving part for receiving the electrode assembly in the laminate sheet and thermally welding an additional sheet separated from the laminate sheet or a sheet extending from the laminate sheet to the laminate sheet while the electrode assembly is received in the receiving part.

The receiving part may be formed in the pouch-type case by partially compressing the aluminum laminate sheet that has a thickness of approximately 113□ using a die and punch according to a process similar to a deep-throwing process. Since the thickness of the aluminum laminate sheet is small, however, the aluminum laminate sheet may break during the compression of the aluminum laminate sheet. For this reason, it is difficult to form the receiving part such that the receiving part has a depth of 15 mm or more.

Meanwhile, a separation-type battery case is constructed by overlapping two sheet-type cases in a sealing fashion. Consequently, it is required for both receiving parts to be overlapped with each other in position at while an electrode assembly is received in the receiving parts during the manufacture of a battery. When the electrode assembly is not received in the receiving parts in position, internal short circuits occur. For this reason, additional guide units are needed, which increases the manufacturing costs of the battery. In addition, the two sheet-type cases are coupled with each other at four sides thereof to form sealing parts. As a result, the two-unit battery case is in contact with the atmosphere at all the four sides thereof, and therefore, when the two-unit battery case is used for a long period of time, a possibility of the introduction of air into the two-unit battery case greatly increases, which reduces the service life of the battery.

In order to solve the above-mentioned problems, there have been proposed several technologies for forming two corresponding receiving parts at a one-unit sheet-type case and overlapping the two corresponding receiving parts with each other. For example, Japanese Patent Application Publication No. 2005-285503 and No. 2005-285506 disclose a technology for forming two corresponding receiving parts in a one-unit laminate sheet such that the two corresponding receiving parts are spaced a predetermined distance from each other and bending the middle region of the one-unit laminate sheet between the receiving parts while an electrode assembly is received in one of the receiving parts, thereby manufacturing a battery. This battery manufacturing technology reduces the depth of the receiving parts formed at the laminate sheet by approximately a half. Furthermore, a sealing part formed at one of four sides of the battery is maintained in a sealed state.

While the laminate sheet is compressed to form the two adjacent receiving parts in the laminate sheet, however, the middle region of the laminate sheet, which will be bent later, is stretched such that the two receiving parts can be formed at opposite sides of the middle region of the laminate sheet. As a result, the mechanical strength of the laminate sheet decreases as compared to when the laminate sheet is stretched in one direction with the result that the laminate sheet may easily break during forming the receiving parts and/or bending the laminate sheet.

Consequently, there is required a technology for preventing a one-unit battery case from breakage during forming electrode assembly receiving parts in the battery case and/or bending the battery case to overlap the receiving parts, thereby minimizing the product defect rate, and manufacturing a pouch-type battery through a simple assembly process.

DISCLOSURE OF INVENTION

Technical Problem

Therefore, the present invention has been made to solve the above problems, and other technical problems that have yet to be resolved.

Specifically, it is an object of the present invention to provide a pouch-type battery that is manufactured with a capacity equivalent to twice that of a conventional battery through a simple assembly process, and is constructed in a structure in which a battery case is prevented from breakage during the assembly process.

It is another object of the present invention to provide a pouch-type battery including a one-unit battery case constructed in a structure in which an electrode assembly is easily received in a receiving part in position, and sealing parts in contact with the atmosphere are minimized, thereby increasing the service life of the battery.

Technical Solution

In accordance with one aspect of the present invention, the above and other objects can be accomplished by the provision of a pouch-type battery including a cathode and an anode protruding from opposite sides of a battery case in opposite directions, wherein the pouch-type battery is constructed in a structure in which two receiving parts are formed at a one-unit sheet-type battery case in a symmetrical fashion such that an electrode assembly is received in the receiving parts, the battery case is bent between the two receiving parts (along a bending line) such that one of the receiving parts overlaps with the other receiving part while the electrode assembly is received in the other receiving part, the bent battery case being sealed, the two receiving parts are continuously formed while the two receiving parts are in contact with the bending line, and the battery case is provided at the edge thereof where the bending line runs with bent depression parts having a depth equivalent to that of the receiving parts.

Consequently, the pouch-type battery according to the present invention is manufactured through a simple assembly process including a receiving part forming process, an electrode assembly mounting process, a battery case bending process, and a battery case sealing process. Also, the two receiving parts overlap with each other in position. Especially, breakage of the battery case is prevented during the receiving part forming process and the battery case bending process. Furthermore, the sealing parts through which the inside of the battery may communicate with the outside are minimized, thereby increasing the service life of the battery.

According to the present invention, the two receiving parts are constructed in a structure in which the two receiving part partially or completely communicate with each other. The two receiving parts may be in contact with the bending line. In a preferred embodiment, the two receiving parts completely communicate with each other about the bending line. In this case, the two receiving parts constitute an integral receiving structure, and the two receiving parts are divided about the bending line running the middle of the integral receiving structure.

The bending line is a region corresponding to the thickness-direction side of the electrode assembly when the electrode assembly is mounted in the battery case. Specifically, the bending line is a kind of imaginary line located between the two receiving parts. Consequently, the region where the bending is practically performed is the corresponding region of the battery case spaced from the bending line by a length equivalent to approximately half the thickness of the electrode assembly.

The two receiving parts have the same depth or different depths. Preferably, the two receiving parts have the same depth. The two receiving parts may be simultaneously formed by a single process.

The bent depression parts are formed at the edge of the battery case where the bending line runs. More specifically, the edge of the battery case is depressed at the position corresponding to the bending line by the depth of the receiving parts on the vertical section of the battery case. The bent depression parts are symmetrical to each other about the bending line. During the manufacture of the battery, the bent depression parts are sealed.

The secondary battery according to the present invention is preferably applicable to a pouch-type secondary battery having an electrode assembly mounted in a pouch-type case made of a laminated sheet including a metal layer and a resin layer, for example an aluminum laminate sheet.

As previously described, the laminate sheet is very thin. Consequently, it is difficult to form the receiving parts such that each receiving part has a depth of 15 mm or more. As a result, it is difficult to manufacture a battery having a thickness of 15 mm or more. According to the present invention, however, the two receiving parts are continuously formed, and then the two receiving parts are overlapped with each other. As a result, the present invention overcomes the limit of 15 mm. Consequently, the respective receiving parts are formed with the maximum depth according to the present invention, whereby it is possible to manufacture a battery having a thickness of 15 mm or more by mounting one electrode assembly having a thickness of at least 15 mm, preferably 30 mm or less, or two electrode assemblies having a thickness of 15 mm or less in the receiving parts. Here, the thickness of the battery is decided as the thickness of the electrode assembly, where an electrochemical reaction occurs, or the depth of the receiving parts in which the electrode assembly is received.

In a preferred embodiment, the battery case is constructed in a structure in which the sheets outside the receiving parts opposite to the bending line extends such that the outside sheets have a relatively large length. In this case, the battery may be manufactured by receiving the electrode assembly in one of the receiving parts, bending the battery case along the bending line, sealing all the sealing parts (inter-contact regions) excluding the extended outside sheets, injecting an electrolyte through the gap between the outside sheets, sealing the outside sheets, the cutting the sealed outside sheets into a predetermined size. Due to this structure of the battery case, it is possible to easily inject the electrolyte into the battery case, and the electrolyte is effectively prevented from overflowing due to a mistake of an operator during the injecting process.

When the battery case is constructed in the above-described structure, the inter-contact regions of the battery case may be sealed by various methods. Preferably, the sealing is accomplished by thermal welding, which increases the coupling force between the inter-contact regions of the battery case.

In accordance with another aspect of the present invention, there is provided a medium- or large-sized battery module including the pouch-type battery as a unit cell.

The medium- or large-sized battery module according to the present invention includes two electrode assemblies or an electrode assembly having a double capacity as a unit cell, and the coupling structure thereof is dense. Consequently, it is possible to simplify the assembly process of the battery module and to manufacture the battery module in a more compact structure.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
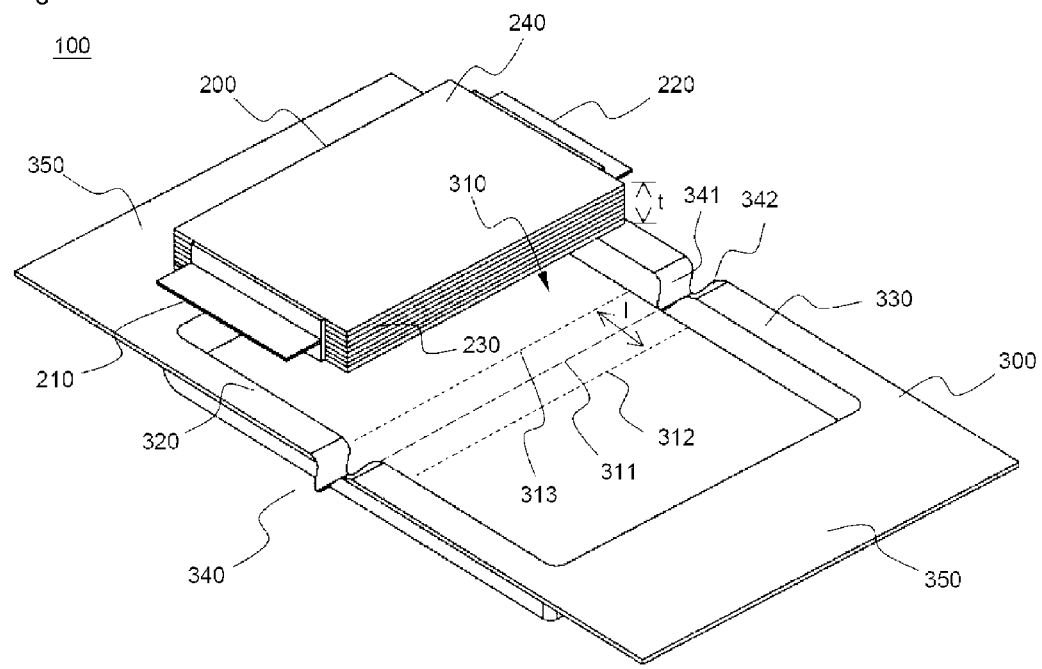
FIG. 1 is an exploded perspective view illustrating a pouch-type battery according to a preferred embodiment of the present invention.

FIG. 1 is an exploded perspective view typically illustrating a pouch-type battery according to a preferred embodiment of the present invention.

Referring to FIG. 1, the pouch-type battery 100 includes an electrode assembly 200 having a cathode 210 and an anode 220 that protrude in opposite directions and a battery case 300 having a receiving part 310 of a width greater than twice that of the electrode assembly 200 and bent depression parts 340 formed at an upper-end sealing part 320 and a lower-end sealing part 330.

The battery case 300 is bent at two bent parts 312 and 313 spaced a predetermined distance from each other about an imaginary bending line of the receiving part 310. As a result, the battery case 300 is folded such that the electrode assembly 200 is received in the receiving part 310 in a sealed state. At this time, the distance (l) between the two bent parts 312 and 313 is approximately equivalent to the thickness (t) of the electrode assembly 200 with the result that the side 230 of the electrode assembly 200 is surrounded by the two bent parts 312 and 313. Consequently, the receiving part 310 has a width corresponding to the top 240, the bottom (not shown), and the side 230 of the electrode assembly 200.

The bent depression parts 340 includes bent depression sealing parts 341 and 342 formed at the upper-end sealing part 320 and the lower-end sealing part 330 at the positions where the imaginary bending line 311 of the receiving part 310 runs. The bent depression sealing parts 341 and 342 are symmetrical to each other about the imaginary bending line 311. Consequently, when the battery case 300 is bent at the two bent parts 312 and 313 about the imaginary bending line 311, the bent depression sealing parts 341 and 342 are brought into contact with each other. The contact regions are sealed by thermal welding.

When the above-described bent depression part is not formed at the battery case constructed such that two halves of the receiving part completely communicate with each other as shown in FIG. 1, the corresponding region of the edge of the battery case is deformed during bending the battery case. As a result, it is not possible to manufacture a structurally stable battery. This will be easily confirmed from FIG. 2, which is a sectional view of the pouch-type battery while the bent depression part is not formed in the pouch-type battery shown.

Figure 2:
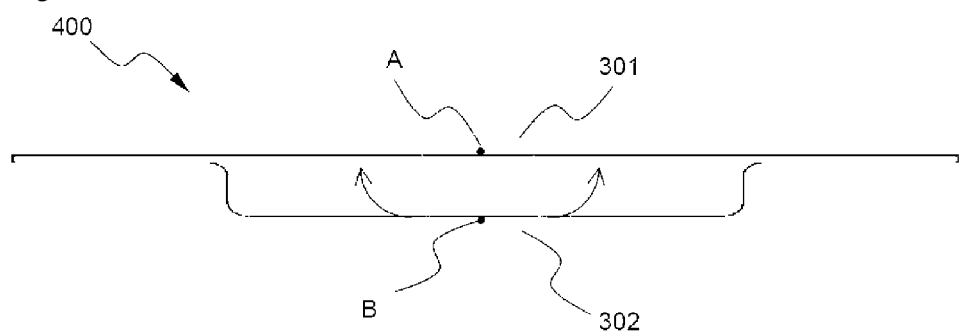
FIG. 2 is a sectional view illustrating the structure of a bent depression part of the pouch-type battery shown in FIG. 1.

Referring to FIG. 2, when a battery case 400 is bent about point A, a large tensile force is applied to the lower end 302 of the battery case 400 in directions indicated by arrows. As previously described, the battery case 400 is made of a very thin laminate sheet. Consequently, the tensile force may break the lower end 302 of the battery case 400.

For this reason, the battery case 400 constructed as shown in FIG. 2 must be bent about point B located at the lower end 302 of the battery case 400. In this case, however, regions of the battery case 400 surrounding point B may be deformed with the result that the upper end 301 of the battery case 400 is folded toward point B. Consequently, it is not possible to manufacture a normal-structure battery having sealability.

On the other hand, when the bent depression part 340 as shown in FIG. 1 is formed at the region corresponding to the upper end 301 of the battery case 300, the above-mentioned problems are solved. The structure of the bent depression part 340 will be easily confirmed from FIG. 3.

Figure 3:
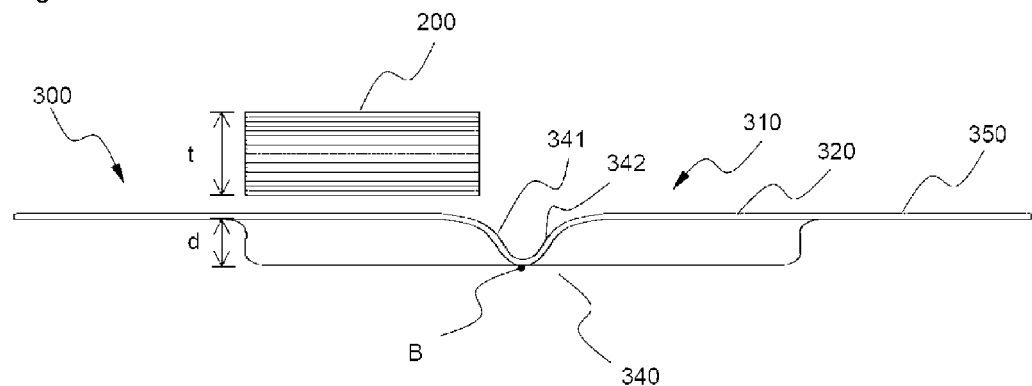
FIG. 3 is a sectional view of the pouch-type battery while the bent depression part is not formed in the pouch-type battery shown in FIG. 2.

Referring to FIG. 3, the bent depression part 340 is formed such that the bent depression part 340 is depressed in the depth (d) direction of the receiving part 310. Specifically, the bent depression part 340 is formed to approximately the same depth (d) as the receiving part 310. When the battery case 300 is bent about point B, the bent depression sealing parts 341 and 342 are brought into contact with each other. In the structure of FIG. 3, the bent depression part 340 is tapered such that the bent angle of the bent depression part 340 increases toward the top of the bent depression part 340.

The receiving part 310 of the battery case 300 is bent about the bent depression part 340 to receive the electrode assembly 200 in the vertical direction. Consequently, the electrode assembly 200 having a thickness (t) equivalent to twice the depth (d) of the receiving part 310 can be received in the receiving part 310. Although not shown in the drawing, two electrode assemblies (not shown), each having a thickness equivalent to the depth (d) of the receiving part 310, may be mounted in the battery case 300.

Referring back to FIG. 1, the pouch-type battery 100 may be manufactured by receiving the electrode assembly 200 in a half of the receiving part 310 such that the cathode 210 and the anode 230 are located at the upper-end sealing part 320 and the lower-end sealing part 330, respectively, bending the battery case 300 at the two bent parts 312 and 313 such that two halves of the upper-end sealing part 320, two halves of the lower-end sealing part 330, and two halves of the side sealing part 350 are brought into contact with each other, respectively, thermally welding the two halves of the upper-end sealing part 320 and the two halves of the lower-end sealing part 330, injecting an electrolyte through the gap between the two halves of the side sealing part 350, thermally welding the two halves of the side sealing part 350, and cutting the side sealing part 350 into a predetermined length.

The battery case 300 can be easily bent by the provision of the bent depression part 340. Furthermore, the battery case 300 is bent while the bent depression sealing parts 341 and 342 of the bent depression part 340 are brought into contact with each other. Consequently, the battery case 300 is securely sealed without generation of wrinkles.

Figure 4:
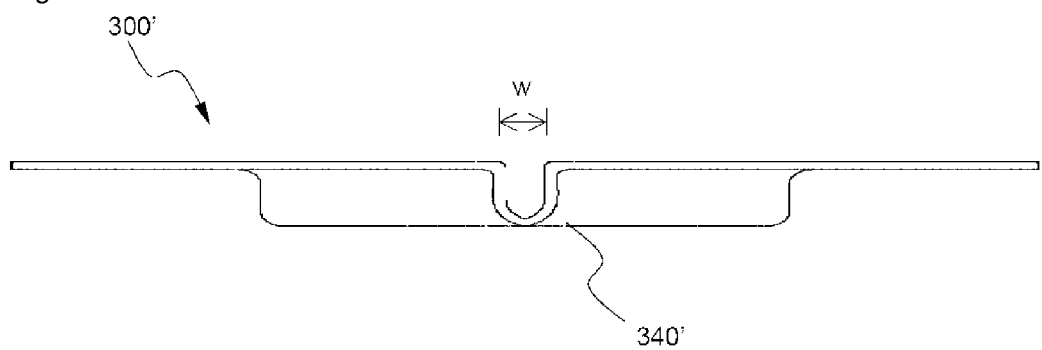
FIG. 4 is a sectional view illustrating the structure of a bent depression part according to a modification of FIG. 2.
Figure 5:
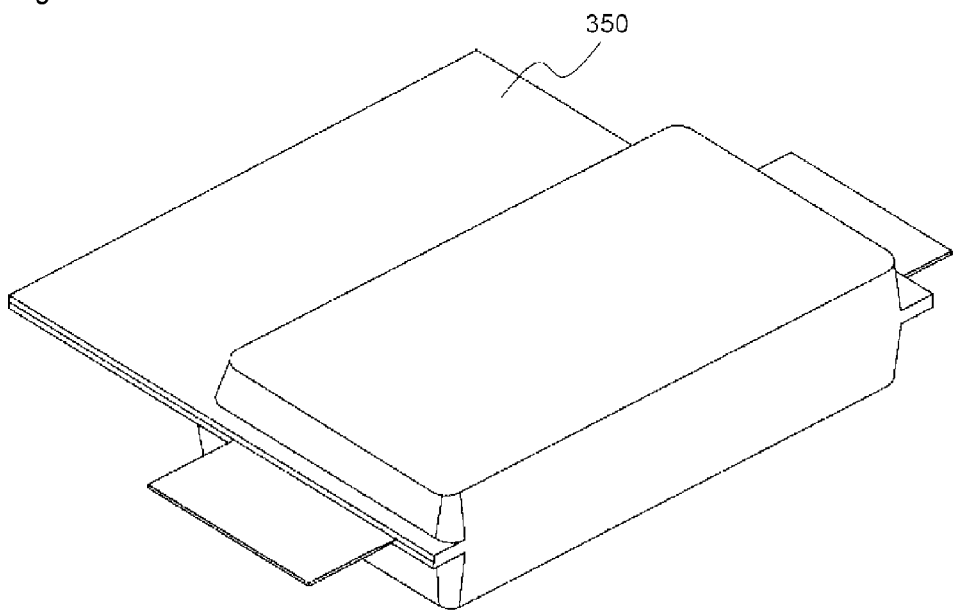
FIG. 5 is a perspective view illustrating the assembly of the pouch-type battery shown in FIG. 1.

FIG. 4 is a sectional view typically illustrating the structure of a bent depression part according to a modification of FIG. 3, and FIG. 5 is a perspective view illustrating the assembly of the pouch-type battery shown in FIG. 1.

Referring first to FIG. 4, the bent depression part 340' is constructed in approximately a U-shaped vertical sectional structure having a predetermined width (w). The bent depression part 340' is identical in principle to the bent depression part 340 of FIG. 3 in that the spaced regions of the bent depression part 340' are brought into contact with each other during a bending process and the contact regions of the bent depression part 340' are sealed during a sealing process.

When the bending and sealing processes are performed as described above, a battery cell is manufactured in a structure in which the side sealing part 350 extends in the direction opposite to the bent depression part 340' as shown in FIG. 5. Injecting an electrolyte through the side sealing part 350, sealing the bent depression part 340' after the injection of the electrolyte, and cutting the bent depression part 340' into a predetermined size are identical to what was previously described in connection with the bent depression part 340.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention provides a pouch-type battery that is manufactured with a capacity equivalent to twice that of a conventional battery through a simple assembly process, and is constructed in a structure in which a battery case is prevented from breakage during the assembly process. Consequently, the present invention has the effect of minimizing the product defect rate. Furthermore, the present invention to provide a pouch-type battery constructed in a structure in which an electrode assembly is easily received in a receiving part in position without the provision of an additional device, and sealing parts in contact with the atmosphere are minimized. Consequently, the present invention has the effect of minimizing the introduction of air or moisture and the leakage of an electrolyte, thereby increasing the service life of the battery.

The invention claimed is:

1. A pouch-type battery including an electrode assembly having a cathode/separator/anode structure which is mounted into a pouch-shaped battery case and sealed by the battery case, wherein the pouch-type battery includes the cathode and the anode protruding from opposite sides of the battery case in opposite directions, the pouch-type battery is constructed in a structure in which two receiving parts are formed at a one-unit sheet-type battery case in a symmetrical fashion such that an electrode assembly is received in the receiving parts, the battery case is bent between the two receiving parts along a single bending line such that one of the receiving parts overlaps with the other receiving part while the electrode assembly is received in the other receiving part, the bent battery case being sealed, the two receiving parts are continuously formed while the two receiving parts are in contact with the single bending line, and the battery case is provided at the edge thereof where the single bending line runs with bent depression parts having a depth equivalent to that of the receiving parts, wherein the two receiving parts communicate with each other about the single bending line, the two receiving parts constitute an integral receiving structure, and the receiving parts are divided about the single bending line running through the middle of the integral receiving structure, and wherein the sealing is accomplished by thermal welding.

2. The battery according to claim 1, wherein the two receiving parts have the same depth.

3. The battery according to claim 1, wherein the battery case is made of a laminate sheet including a metal layer and a resin layer.

4. The battery according to claim 3, wherein the laminate sheet is an aluminum laminate sheet.

5. The battery according to claim 1, wherein the sheets outside the receiving parts opposite to the bending line extend such that the outside sheets have a large length, and the battery is manufactured by receiving the electrode assembly in one of the receiving parts, bending the battery case along the single bending line, sealing regions of the battery case excluding the extended outside sheets, injecting an electrolyte through the gap between the outside sheets, sealing the outside sheets, and cutting the sealed outside sheets into a predetermined size.

6. A battery module including a pouch-type battery according to any one of claim 1 as a unit cell.

7. A battery module including a pouch-type battery according to claim 2 as a unit cell.

8. A battery module including a pouch type battery according to claim 3 as a unit cell.

9. A battery module including a pouch-type battery according to claim 4 as a unit cell.

10. A battery module including a pouch type battery according to claim 5 as a unit cell.

* * * * *